United States Patent
Cheng et al.

(10) Patent No.: US 8,208,537 B2
(45) Date of Patent: Jun. 26, 2012

(54) VIDEO TRANSCODING WITH SUPPRESSION ON DRIFT ERRORS

(75) Inventors: Ju-Yun Cheng, Kaohsiung (TW); Hon-Wen Pon, Taipei (TW); Wei-Fu Chen, Taipei County (TW)

(73) Assignee: Panasonic Corporation, Osaka (JP)

( * ) Notice: Subject to any disclaimer, the term of this patent is extended or adjusted under 35 U.S.C. 154(b) by 1005 days.

(21) Appl. No.: 12/160,130

(22) PCT Filed: Jan. 24, 2007

(86) PCT No.: PCT/JP2007/051532
§ 371 (c)(1),
(2), (4) Date: Jul. 7, 2008

(87) PCT Pub. No.: WO2007/086589
PCT Pub. Date: Aug. 2, 2007

(65) Prior Publication Data
US 2009/0010327 A1    Jan. 8, 2009

(30) Foreign Application Priority Data
Jan. 25, 2006 (CN) .......................... 2006 1 0004504

(51) Int. Cl.
*H04N 11/02* (2006.01)

(52) U.S. Cl. ......... 375/240.03; 375/240.04; 375/240.05; 375/240.16; 375/240.27

(58) Field of Classification Search ........... 375/240.03–240.05, 240.16, 240.27
See application file for complete search history.

(56) References Cited

U.S. PATENT DOCUMENTS

| | | |
|---|---|---|
| 6,700,935 B2 | 3/2004 | Lee |
| 2003/0206588 A1 | 11/2003 | Etoh et al. |
| 2003/0206590 A1 | 11/2003 | Krishnamachari |
| 2003/0215012 A1 | 11/2003 | Etoh et al. |
| 2005/0147163 A1 | 7/2005 | Li et al. |
| 2008/0101473 A1 | 5/2008 | Tanaka et al. |

FOREIGN PATENT DOCUMENTS

WO    03/094527    11/2003

OTHER PUBLICATIONS

Nagayoshi et al., "Rate Control Scheme for MPEG Transcoder Considering Drift-Error Propagation", vol. 4067, Jun. 20, 2000, pp. 485-496.

(Continued)

*Primary Examiner* — Hassan Kizou
*Assistant Examiner* — Ashil Farahmand
(74) *Attorney, Agent, or Firm* — Greenblum & Bernstein, P.L.C.

(57) ABSTRACT

A bit rate transcoding method includes: (a) receiving a motion vector of a current macroblock (MB); (b) retrieving an error count of a referenced previous MB for setting it as the error count of the current MB; (c) calculating a weight value; (d) calculating a new quantization parameter, and multiplying the same by the weight value so as to obtain a weighted new quantization parameter falling into a continuous distribution; (e) selectively using a transformation technique to transform the weighted new quantization parameter into one falling into a discrete distribution; (f) if the weighted new quantization parameter exhibits the continuous distribution, and if the weighted new quantization parameter is within a predetermined range, incrementing the error count by a predetermined value; and (g) if the weighted new quantization parameter exhibits the discrete distribution, and if the weighted new quantization parameter does not belong to a smallest quantization parameter cluster, incrementing the error count by a predetermined value.

15 Claims, 6 Drawing Sheets

OTHER PUBLICATIONS

Website article: http://www.fh-friedberg.de/fachbereiche/e2/telekom-labor/zinke/mk/mpeg2beg/whatisit.htm#Quantization, downloaded on Oct. 5, 2011.

Website article: http://en.wikipedia.org/wiki/Quantization_(image_processing), downloaded on Oct. 4, 2011.

Website article: http://en.wikipedia.org/wiki/MPEG-1, downloaded on Oct. 4, 2011.

Website article: http://www.fh-friedberg.de/fachbereiche/e2/telekom-labor/zinke/mk/mpeg2beg/beginnzi.htm, downloaded on Oct. 5, 2011.

Website article: http://www.impulseadventure.com/photo/jpeg-quantization.html, downloaded on Oct. 31, 2011.

VIDEO TRANSCODING WITH SUPPRESSION ON DRIFT ERRORS

TECHNICAL FIELD

The invention relates to a bit rate transcoding method, a transcoder and an integrated circuit, and more particularly to a bit rate transcoding method and a transcoder capable of suppressing drift errors.

BACKGROUND ART

A transcoder is an effective tool for dynamically encoding a coded stream into an output stream having a different bit rate, especially in a network environment and in diverse video services. Without completely decoding an input stream into its uncompressed format, the transcoder is capable of re-encoding the input stream into a compressed stream with a different bit rate.

Compared to a conventional re-encoder or closed loop architecture, open loop architecture has characteristics of low computational complexity and fast speed. In the open loop architecture, an input stream is partially decoded to generate Discrete Cosine Transform (DCT) coefficients. These DCT coefficients are subsequently re-quantized using a new quantization parameter (Qp) related to an output bit rate.

The calculation of the new Qp will affect the performance of the output stream. During the re-quantization of macroblocks (MBs), drift errors are easily generated due to data loss attributed to the MBs that are repeatedly referenced by the MBs of succeeding frames. For instance, some prior patents only consider the ratio of a new bit rate to an original bit rate, thereby easily resulting in drift errors.

Referring to FIGS. 1 and 2, in U.S. Pat. No. 6,700,935 B2, entitled "Stream based bitrate transcoder for MPEG coded video", there is disclosed a method comprising the following steps. First, information comprising motion vectors and picture/macroblock types for all frames in a Group of Pictures (GOP) is extracted from a bit stream. Next, a number of bits for encoding DCT coefficients by Variable Length Coding (VLC) decoding is calculated, and the bit stream is decoded and transformed into a DCT bit stream accordingly. After a bit rate difference is determined, some DCT coefficients are dropped based upon the information in order to achieve the bit rate difference in the DCT bit stream, wherein the bit rate difference (D) is distributed among Intra-MB and Inter-MB groups based upon the following equations:

$$D = D\_intra\_mb + D\_inter\_mb$$

$$(D\_intra\_mb)/(D\_inter\_mb) = (A'p + A'b)/(Ai + Ap + Ab)$$

where A is the average bit count, A' is the new average bit count, i represents anchor frames, p represents predicted frames, and b represents bidirectional frames.

Reference links of each MB can be calculated according to associated motion vectors and the MB type. The number of reduction bits of each MB can be determined according to priority given to the reference links. FIG. 2 illustrates a search scope and a best matching macroblock for macroblock (K) in frame (i+1).

As shown in FIG. 2, based on the motion vector and the position of the current macroblock (K), the reference links may be counted equally among macroblocks (A), (B), (C), and (D), or proportionally to the areas in the macroblocks (A), (B), (C) and (D) respectively covered by the best matching macroblock. In the case where the reference links are counted equally among the macroblocks (A), (B), (C) and (D), each reference count is incremented by 1. On the other hand, in the case where the reference links are counted proportionally to the areas in the macroblocks (A), (B), (C) and (D) respectively covered by the best matching macroblock, the reference link counts are incremented by fractions associated with the areas in the macroblocks (A), (B), (C) and (D) respectively covered by the best matching macroblock. In the latter case, the fraction numbers have an order of C>A=D>B. After the calculation of the reference links is finished, the number of reduction bits may again be proportionally distributed.

In the aforementioned U.S. patent, DCT coefficients that can be dropped for each MB are calculated according to the picture/macroblock type and the motion reference numbers. However, due to accumulation of errors, the dropped coefficients will lead to continuous picture quality loss. To remedy this situation, this patent teaches pre-scanning of the whole GOP so as to obtain information, such as the picture/macroblock type, coding complexity, and motion vectors. By utilizing these data, motion reference numbers can be calculated according to the importance of each MB so as to determine the number of bits to be dropped and to reduce drift errors.

Nevertheless, the calculation of motion reference numbers requires pre-scanning of the whole GOP to retrieve associated motion vectors and obtain the positions of the referenced MBs. The process as such increases computational complexity, and is not suitable for all situations, such as environments with time or resource constraints.

DISCLOSURE OF INVENTION

Therefore, one object of the present invention is to provide a bit rate transcoding method that is capable of suppressing drift errors so as to increase transcoding efficiency, to suppress drift errors, and to improve picture quality, while only using little resource to store error accumulation tables.

According to one aspect of the present invention, there is provided a bit rate transcoding method capable of suppressing drift errors. The bit rate transcoding method comprises the steps of: (a) receiving a motion vector of a current macroblock of a current frame; (b) according to the motion vector, retrieving an error count of a referenced macroblock from a previous frame, and setting an error count of the current macroblock to the error count of the referenced macroblock; (c) calculating a weight value; (d) calculating a new quantization parameter using a bit rate control algorithm, and multiplying the new quantization parameter by the weight value so as to obtain a weighted new quantization parameter, wherein the weighted new quantization parameter falls into a continuous distribution; (e) selectively using a predetermined transformation technique to transform the weighted new quantization parameter, wherein the resulting weighted new quantization parameter falls into a discrete distribution; (f) if the weighted new quantization parameter exhibits a continuous distribution, determining if the weighted new quantization parameter of one of the macroblocks is larger than a threshold value of quantization parameter and smaller than a preset statistical value of quantization parameter, incrementing the error count of said one of the macroblocks by a first predetermined value if affirmative, and preserving the error count of said one of the macroblocks if otherwise; and (g) if the weighted new quantization parameter exhibits a discrete distribution, determining if the weighted new quantization parameter of one of the macroblocks belongs to a smallest quantization parameter cluster, preserving the error count of said one of the macroblocks if affirmative, and incrementing the error count of said one of the macroblocks by a second predetermined value if otherwise.

Another object of the present invention is to provide a bit rate transcoder that is capable of suppressing drift errors so as to increase transcoding efficiency, to suppress drift errors, and to improve picture quality, while only using little resource to store error accumulation tables. According to another aspect of the present invention, there is provided a bit rate transcoder capable of suppressing drift errors. The bit rate transcoder transforms an input bit stream into an output bit stream having a different bit rate. The input bit stream includes a set of DCT coefficients, bit rate control information, an old quantization parameter, and a set of motion vectors of a current macroblock of a current frame. The transcoder comprises an open loop transcoding module, a previous frame error table, a current frame error table, an error handling unit, and an error determining unit. The open loop transcoding module includes a variable length decoding (VLD) unit, an inverse quantizing unit, a quantizing unit, a variable length coding (VLC) unit, a bit allocation unit, and a quantization parameter calculating unit. The DCT coefficients are inputted into the quantizing unit after decoded by the VLD unit and inverse quantized by the inverse quantizing unit in sequence. The bit rate control information and the old quantization parameter are inputted into the quantization parameter calculating unit after processed by the bit allocation unit. The quantization parameter calculating unit calculates a new quantization parameter using a bit rate control algorithm. The previous frame error table is used to record error counts of all of the macroblocks of a previous frame, and to receive the motion vectors of the current macroblock. The current frame error table is used to record the error count of the current macroblock, wherein the error count of the current macroblock is retrieved according to the motion vectors from the error count of a previous macroblock referenced by the current macroblock in the previous frame error table. The error handling unit is used to calculate a weight value to be sent to the quantization parameter calculating unit. The quantization parameter calculating unit multiplies the new quantization parameter by the weight value so as to obtain a weighted new quantization parameter falling into a continuous distribution. The quantization parameter calculating unit further selectively uses a predetermined transformation technique to transform the weighted new quantization parameter exhibiting the continuous distribution into one falling into a discrete distribution. The quantization parameter calculating unit sends the weighted new quantization parameter exhibiting the continuous distribution or the discrete distribution to the quantizing unit. The quantizing unit may apply the weighted new quantization parameter exhibiting the continuous distribution or the discrete distribution to re-quantize the DCT coefficients for subsequent input to the VLC unit. The VLC unit performs encoding to generate a portion of the output bit stream having a different bit rate. The error determining unit is used to adopt a corresponding policy according to whether or not the weighted new quantization parameter exhibits the continuous distribution. If affirmative, and if the weighted new quantization parameter of one of the macroblocks is larger than a threshold value of quantization parameter and smaller than a preset statistical value of quantization parameter, the error count of said one of the macroblocks is incremented by a first predetermined value. If otherwise, and if the weighted new quantization parameter of one of the macroblocks does not belong to a smallest quantization parameter cluster, the error count of said one of the macroblocks is incremented by a second predetermined value.

Yet another object of the present invention is to provide an integrated circuit that can increase transcoding efficiency, suppress drift errors, and improve picture quality, while only using little resource to store error accumulation tables.

According to yet another aspect of the present invention, there is provided an integrated circuit for transforming an input bit stream into an output bit stream with a different bit rate. The input bit stream includes a set of DCT coefficients, bit rate control information, an old quantization parameter, and a set of motion vectors of a current macroblock of a current frame. The integrated circuit comprises an open loop transcoding module, a previous frame error table, a current frame error table, an error handling unit, and an error determining unit. The open loop transcoding module includes a VLD unit, an inverse quantizing unit, a quantizing unit, a VLC unit, a bit allocation unit, and a quantization parameter calculating unit. The DCT coefficients are inputted into the quantizing unit after decoded by the VLD unit and inverse quantized by the inverse quantizing unit in sequence. The bit rate control information and the old quantization parameter are inputted into the quantization parameter calculating unit after processed by the bit allocation unit. The quantization parameter calculating unit calculates a new quantization parameter using a bit rate control algorithm. The previous frame error table is used to record error counts of all of the macroblocks of a previous frame, and to receive the motion vectors of the current macroblock. The current frame error table is used to record the error count of the current macroblock, wherein the error count of the current macroblock is retrieved according to the motion vectors from the error count of a previous macroblock referenced by the current macroblock in the previous frame error table. The error handling unit is used to calculate a weight value to be sent to the quantization parameter calculating unit. The quantization parameter calculating unit multiplies the new quantization parameter by the weight value so as to obtain a weighted new quantization parameter falling into a continuous distribution. The quantization parameter calculating unit further selectively uses a predetermined transformation technique to transform the weighted new quantization parameter exhibiting the continuous distribution into one falling into a discrete distribution. The quantization parameter calculating unit sends the weighted new quantization parameter exhibiting the continuous distribution or the discrete distribution to the quantizing unit. The quantizing unit may apply the weighted new quantization parameter exhibiting the continuous distribution or the discrete distribution to re-quantize the DCT coefficients for subsequent input to the VLC unit. The VLC unit performs encoding to generate a portion of the output bit stream having a different bit rate. The error determining unit is used to adopt a corresponding policy according to whether or not the weighted new quantization parameter exhibits the continuous distribution. If affirmative, and if the weighted new quantization parameter of one of the macroblocks is larger than a threshold value of quantization parameter and smaller than a preset statistical value of quantization parameter, the error count of said one of the macroblocks is incremented by a first predetermined value. If otherwise, and if the weighted new quantization parameter of one of the macroblocks does not belong to a smallest quantization parameter cluster, the error count of said one of the macroblocks is incremented by a second predetermined value.

BRIEF DESCRIPTION OF DRAWINGS

Other features and advantages of the present invention will become apparent in the following detailed description of the preferred embodiment with reference to the accompanying drawings, of which.

BEST MODE FOR CARRYING OUT THE INVENTION

Figure 1:
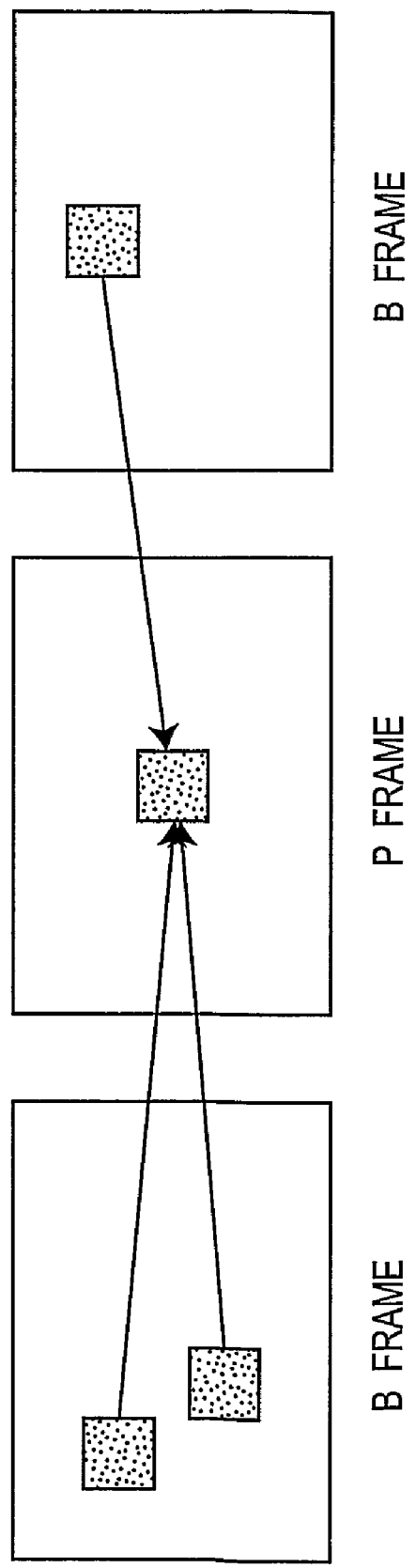
FIG. 1 is a schematic diagram to illustrate the concept of motion reference links to represent referencing activity in the prior art.
Figure 2:
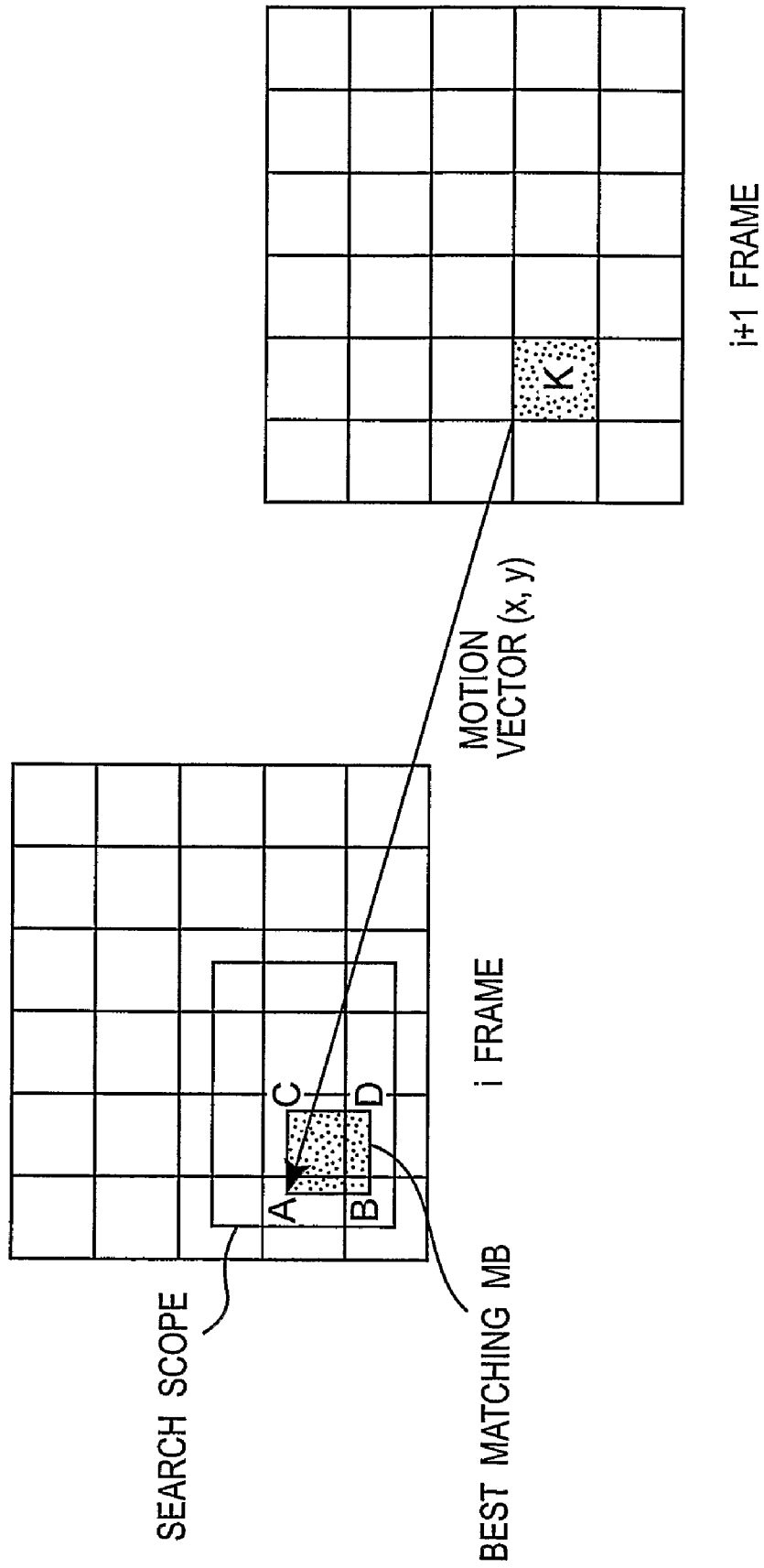
FIG. 2 is a schematic diagram to illustrate the calculation of reference link numbers from a motion vector parsed from a bit stream in the prior art.
Figure 3:
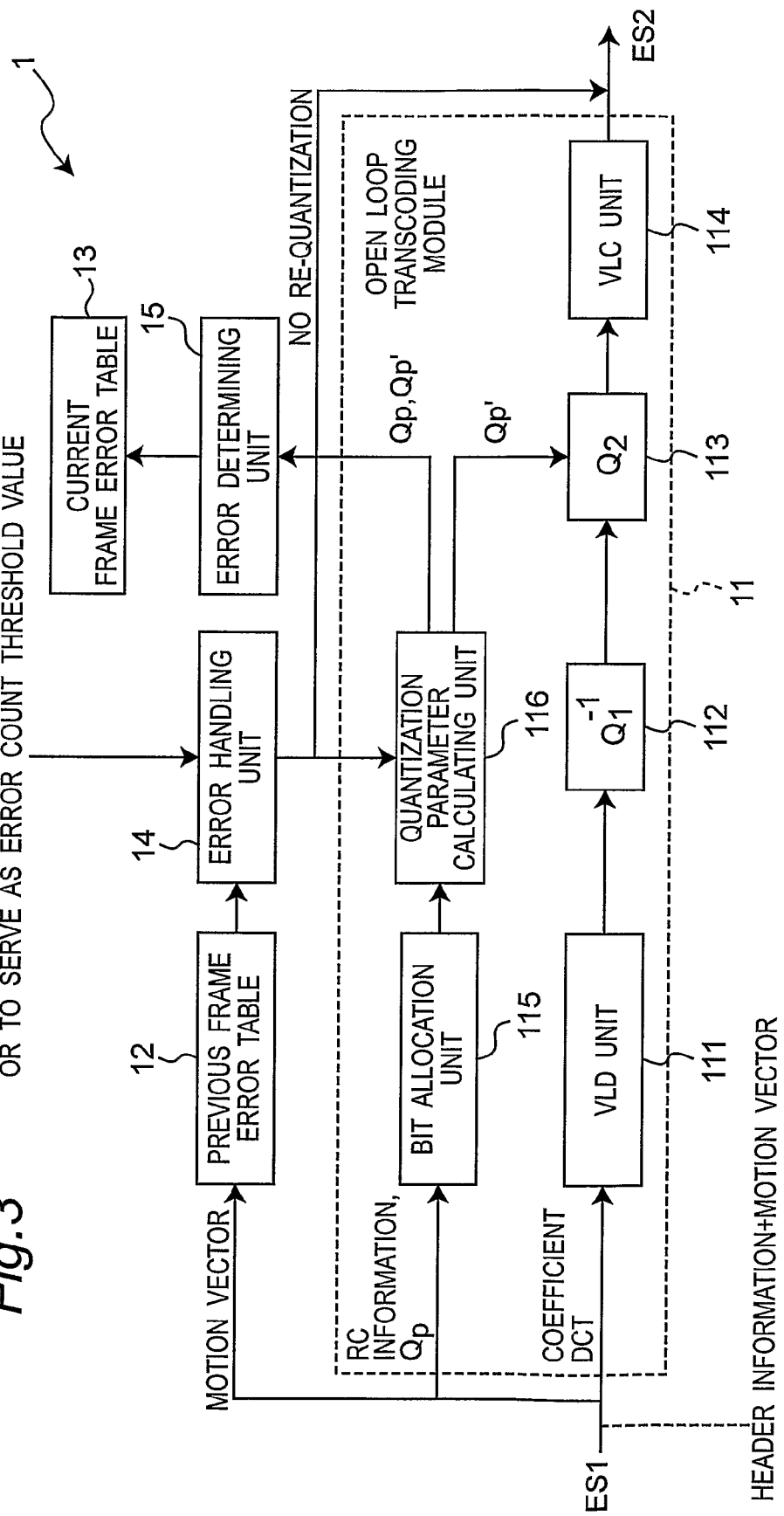
FIG. 3 is a functional block diagram of the preferred embodiment of a bit rate transcoder capable of suppressing drift errors according to the present invention.
Figure 5:
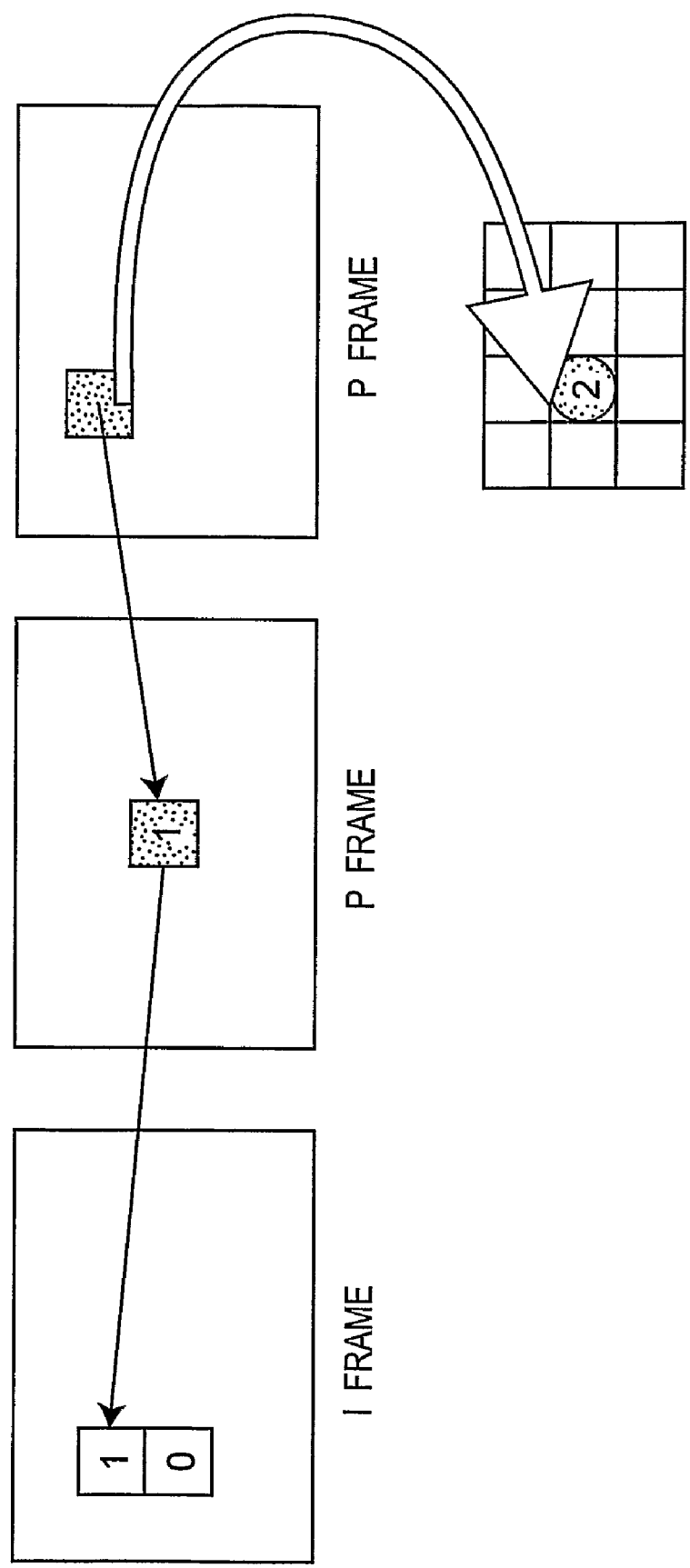
FIG. 5 is a schematic diagram to illustrate the concept of error accumulation in the present invention.

Referring to FIGS. 3 and 5, the preferred embodiment of a bit rate transcoder 1 capable of suppressing drift errors according to the present invention is used for transforming an input bit stream (ES1) into an output bit stream (ES2) having a different bit rate. The input bit stream (ES1) includes a set of DCT coefficients, bit rate control (RC) information, an old quantization parameter (Qp), and a set of motion vectors of a current macroblock of a current frame.

To reduce computational complexity, this invention adjusts re-quantizing procedures according to a distortion degree of each macroblock. The distortion degree of each macroblock is determined by an accumulated error count starting from a header end of the bit stream. Referring to FIG. 5, the numerals therein represent error counts of corresponding macroblocks.

The transcoder 1 comprises an open loop transcoding module 11, a previous frame error table 12, a current frame error table 13, an error handling unit 14, and an error determining unit 15. The open loop transcoding module 11 includes a VLD unit 111, an inverse quantizing unit 112, a quantizing unit 113, a VLC unit 114, a bit allocation unit 115, and a quantization parameter calculating unit 116. The DCT coefficients are inputted into the quantizing unit 113 after decoded by the VLD unit 111 and inverse quantized by the inverse quantizing unit 112 in sequence. The bit rate control (RC) information and the old quantization parameter (Qp) are inputted into the quantization parameter calculating unit 116 after processed by the bit allocation unit 115. The quantization parameter calculating unit 116 then calculates a new quantization parameter using a bit rate control algorithm. In this embodiment, the bit rate control algorithm is Test Model 5 (TM5).

This invention implements error accumulation tables (including the previous frame error table 12 and the current frame error table 13) for accumulating errors of previous frames and new error counts determined from the quantization parameters of the macroblocks of the current frame. The previous frame error table 12 is used to record error counts of all of the macroblocks of the previous frame, and to receive the motion vectors of the current macroblock. The current frame error table 13 is used to record the error count of the current macroblock, wherein the error count of the current macroblock is retrieved according to the motion vectors of the current macroblock from the error count of a previous macroblock referenced by the current macroblock in the previous frame error table 12.

The aforesaid error accumulation tables can be used to calculate each P frame and each B frame, and the error count is the sum of the error count of the macroblock in the previous reference frame referenced by the current macroblock and a new error count obtained according to the new quantization parameter. Moreover, in this invention, the resource needed for storing the error accumulation tables consumes only the storage space used for storing the error counts of all of the macroblocks of two frames.

In this invention, a re-quantization characteristic of the bit rate transcoder 1 is used to determine the error count of each macroblock. In particular, the bit rate transcoder 1 must calculate a new quantization parameter for re-quantizing the DCT coefficients. The error handling unit 14 is used to calculate a weight value that is sent to the quantization parameter calculating unit 116. The quantization parameter calculating unit 116 then multiplies the new quantization parameter by the weight value so as to obtain a weighted new quantization parameter (Qp') that is sent to the quantizing unit 113. Thereafter, the quantizing unit 113 re-quantizes the DCT coefficients using the weighted new quantization parameter (Qp') for subsequent input to the VLC unit 114, which performs encoding to generate the output bit stream having a different bit rate.

For each macroblock in a P frame or a B frame, the error counts in the error accumulation tables can be used as the aforesaid weight value during the calculation of a new quantization parameter to compensate for drift errors. Furthermore, aside from being used as a weight value, the error counts in the error accumulation tables may be used as a threshold value of error count.

The relation between the old and new quantization parameters can be used to calculate the error count of each macroblock in a P frame or a B frame. Based on the old quantization parameters and the new quantization parameters, the quantization parameter calculating unit 116 can determine whether the weighted new quantization parameter exhibits a continuous distribution or a discrete distribution.

The error determining unit 15 is used to execute relevant processing operations according to whether or not the weighted new quantization parameter (Qp') exhibits the continuous distribution. Further details of the bit rate transcoder 1 of the present invention are provided hereinafter with reference to FIGS. 4 to 7.

Figure 4:
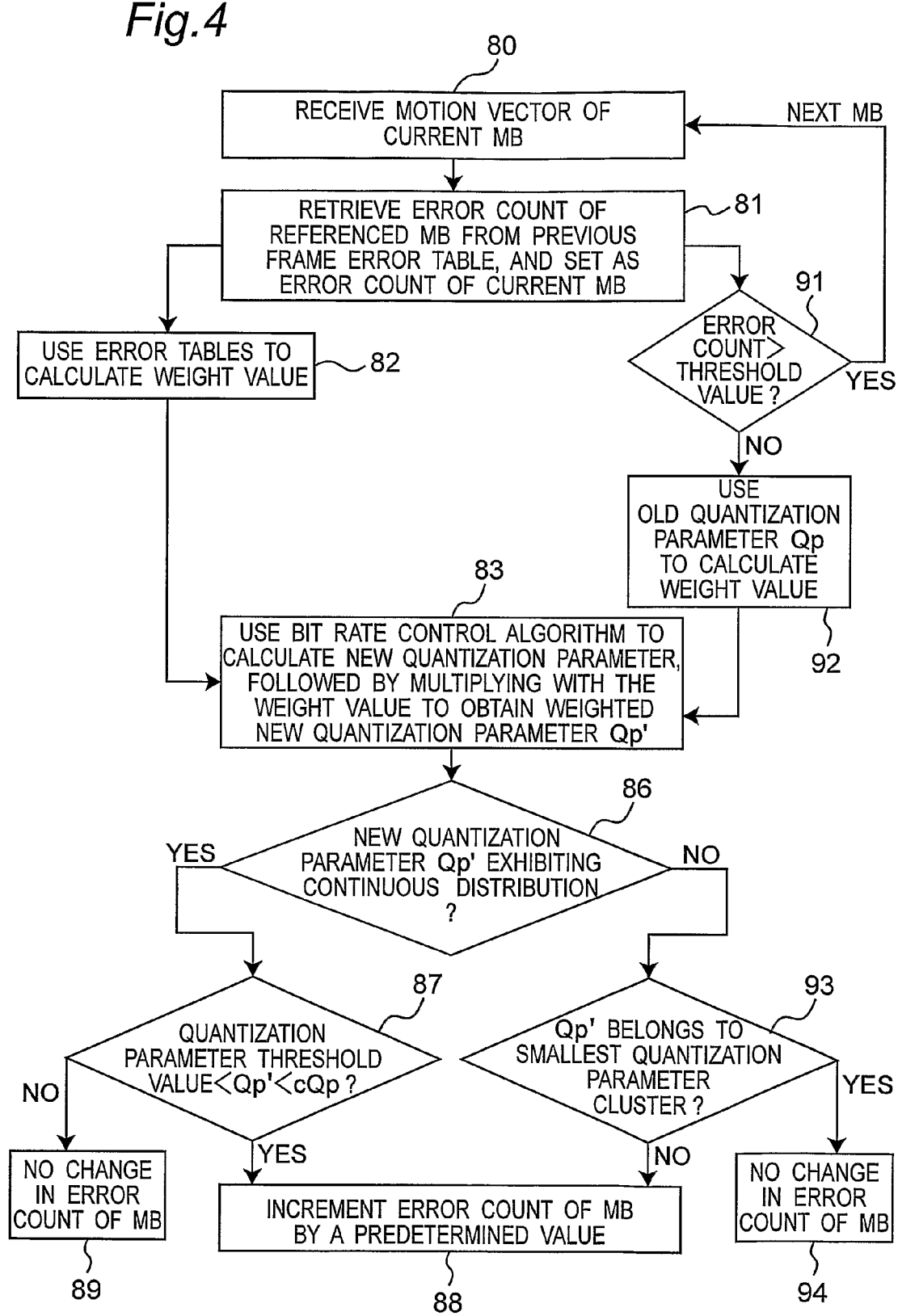
FIG. 4 is a flowchart of the preferred embodiment of a bit rate transcoding method capable of suppressing drift errors according to the present invention.

Referring to FIGS. 3 and 4, the preferred embodiment of a bit rate transcoding method capable of suppressing drift errors according to the present invention comprises the following steps. First, as shown in step 80, the previous frame error table 12 receives the motion vectors of the current macroblock of the current frame. Next, as shown in step 81, according to the motion vectors, the current frame error table 13 retrieves from the previous frame error table 12 the error count of the referenced macroblock, and sets the error count of the current macroblock to the error count of the referenced macroblock.

Next, this invention can calculate the weight value in two ways. As shown in step 82, in the first way, the error handling unit 14 calculates the weight value according to Equations (1) to (3) based on the previous frame error table 12.

avg_err=arithmetic mean of error counts in the previous frame error table    Equation (1)

error=error count of the referenced MB    Equation (2)

weight value=(error+2×avg_err)/(2×error+avg_err)    Equation (3)

Then, as shown in step 83, a weighted new quantization parameter (Qp') is obtained by using a bit rate control algorithm to calculate a new quantization parameter, followed by multiplying the new quantization parameter by the weight value.

In the second way, the error handling unit 14 calculates the weight value based on the old quantization parameter (Qp). Before calculating the weight value based on the old quantization parameter (Qp), it is determined in step 91 whether it is needed to calculate the weight value based on the old quantization parameter (Qp). As shown in step 91, the error handling unit 14 determines if the error count of the current macroblock is larger than a threshold value of error count. The threshold value of error count may be the arithmetic mean of the error counts in the previous frame error table 12. If the determination result is affirmative, re-quantization of the current macroblock is not conducted, and processing according to step 80 and onwards is conducted directly for the next macroblock. If the determination result is negative, the error handling unit 14 calculates the weight value according to Equations (4) and (5) based on the old quantization parameter (Qp).

Qp_avg=arithmetic mean of the quantization parameter of each macroblock in the previous frame    Equation (4)

weight value=(2×CurQuant+$Qp$_avg)/(CurQuant+2×$Qp$_avg)    Equation (5)

where CurQuant is the quantization parameter of the current macroblock.

Next, as shown in step 83, a weighted new quantization parameter (Qp') is obtained by using a bit rate control algorithm to calculate a new quantization parameter, followed by multiplying the new quantization parameter by the weight value.

Referring to FIGS. 3, 4, 6 and 7, in step 86, the error determining unit 15 adopts a corresponding policy according to whether or not the weighted new quantization parameter (Qp') exhibits a continuous distribution. If the determination result in step 86 is affirmative, as shown in step 87, the error determining unit 15 determines if a weighted new quantization parameter (Qp') of one of the macroblocks is larger than a threshold value of quantization parameter and smaller than a preset statistical value of quantization parameter (cxQp). The threshold value of quantization parameter is the old quantization parameter (Qp) multiplied by (n), where (n) is about 1.5 and can be dynamically adjusted. (cxQp) is derived from statistics, and (c) ranges between 1.5 and 2.5. If the determination result in step 87 is affirmative, the error count of said one of the macroblocks is incremented by a predetermined value, such as 1. If the determination result in step 87 is negative, the error count of said one of the macroblocks is preserved.

Figure 7:
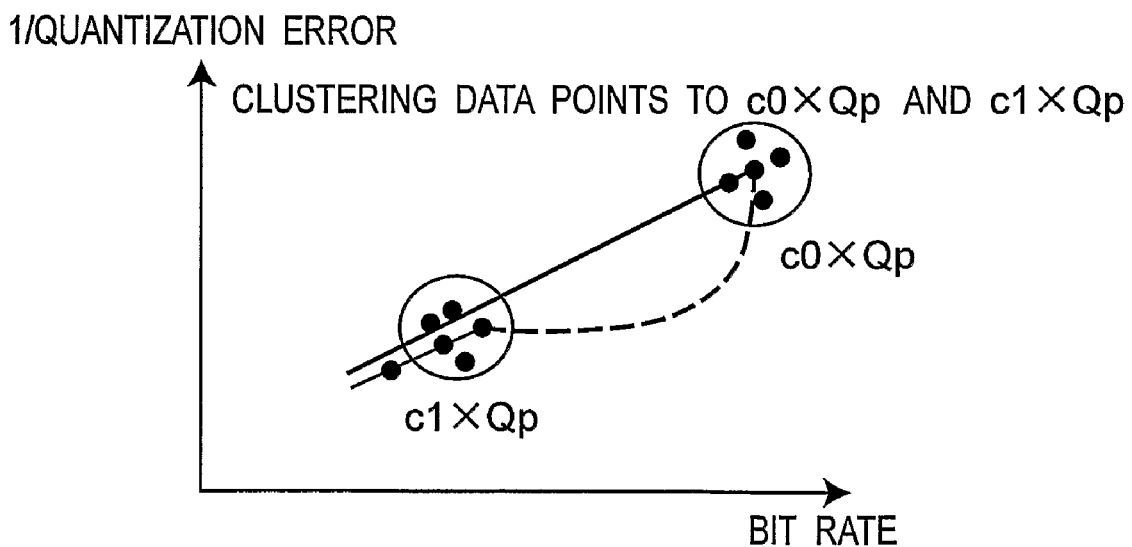
FIG. 7 is a graph illustrating a discrete distribution of weighted new quantization parameters according to the present invention.

If the determination result in step 86 is negative, this means that the weighted new quantization parameter (Qp') exhibits a discrete distribution. As shown in step 93, the error determining unit 15 determines whether the weighted new quantization parameter (Qp') of one of the macroblocks belongs to a smallest quantization parameter cluster. If affirmative, the error count of said one of the macroblocks is preserved. If otherwise, this means that the weighted new quantization parameter (Qp') belongs to a largest quantization parameter cluster, and the error count of said one of the macroblocks is incremented by a predetermined value, such as 1. Moreover, while FIG. 7 shows the data points grouped into two clusters, the present invention is also applicable to the case where the data points are grouped into three clusters (not shown in the drawings). When the data points are grouped into smallest (c0xQp), middle (c1xQp) and largest (c2xQp) quantization parameter clusters, and when the weighted new quantization parameter (Qp') of one of the macroblocks does not belong to the smallest quantization parameter cluster, the error determining unit 15 must further determine whether the weighted new quantization parameter (Qp') belongs to the middle or largest quantization parameter cluster. When the weighted new quantization parameter (Qp') of one of the macroblocks belongs to the middle or largest quantization parameter cluster, the error count of said one of the macroblocks is incremented by a predetermined value corresponding to the middle or largest quantization parameter cluster, such as 1 and 2, respectively.

Figure 6:
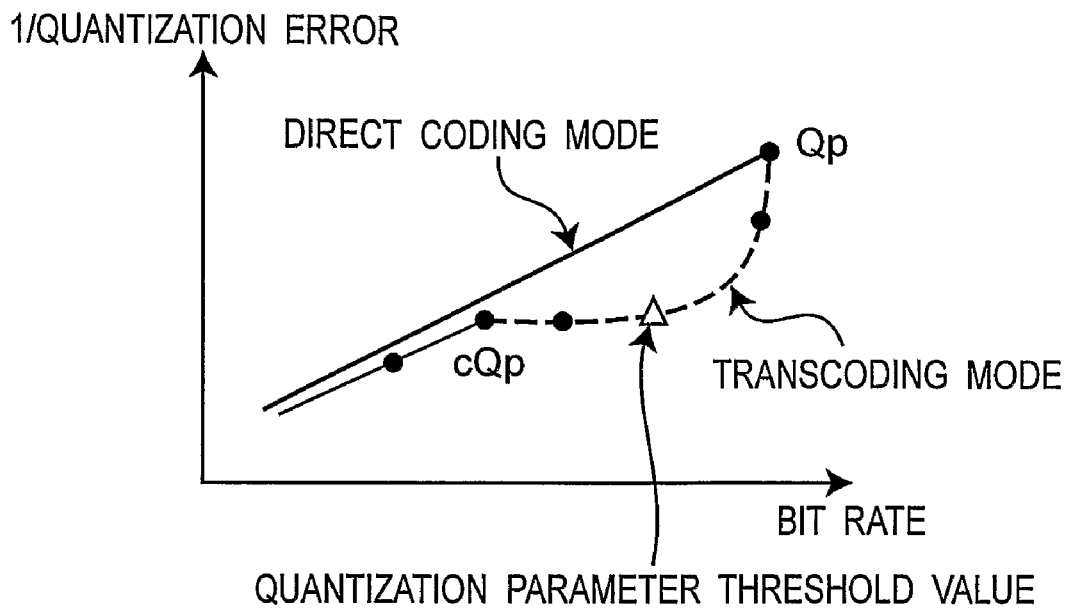
FIG. 6 is a graph illustrating a continuous distribution of weighted new quantization parameters according to the present invention.

It is noted that reciprocals of errors, old quantization parameter bit rates, and the weighted new quantization parameters exhibiting a continuous distribution of all of the macroblocks of the current frame as illustrated in FIG. 6 are generated by the quantization parameter calculating unit 116 of the transcoder 1 through application of the bit rate control algorithm, and that the quantization parameter calculating unit 116 can further apply a transformation technique to transform the continuous distribution relation into a discrete distribution as shown in FIG. 7. Since the transformation technique is readily appreciated by those skilled in the art of the present invention, it will not be detailed herein for the sake of brevity.

Referring to FIG. 3, furthermore, an integrated circuit according to the present invention is used for transforming the input bit stream (ES1) into the output bit stream (ES2) having a different bit rate. The integrated circuit comprises the open loop transcoding module 11, the previous frame error table 12, the current frame error table 13, the error handling unit 14, and the error determining unit 15 shown in FIG. 3. Therefore, according to the aforesaid preferred embodiments of the present invention, this invention has the following advantages. First, compared to the aforementioned U.S. Pat. No. 6,700,935 B2, this invention does not require pre-analysis of the whole GOP to calculate motion reference numbers, thus resulting in higher efficiency. This advantage makes the invention especially suitable for environments that do not allow consumption of additional time for pre-scanning. Next, this invention can dynamically adjust new quantization parameters according to error accumulation tables, thereby suppressing drift errors and improving picture quality. Lastly, this invention only needs very little resource for temporarily storing a previous frame error table and a current frame error table.

In sum, the main feature of the bit rate transcoding method, the transcoder and the integrated circuit capable of suppressing drift errors according to the present invention is: the error handling unit 14 utilizes the error accumulation tables to calculate weight values of quantization parameters or to serve as error count threshold values. The error determining unit 15 then adopts different determination policies, according to whether the weighted new quantization parameter exhibits a continuous distribution or a discrete distribution, to determine whether the error count of a macroblock should be incremented by a predetermined value.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

INDUSTRIAL APPLICABILITY

The present invention can be applied to a bit rate transcoding method, a transcoder and an integrated circuit capable of suppressing drift errors.

The invention claimed is:

1. A bit rate transcoding method capable of suppressing drift errors, comprising:
    (a) receiving a motion vector of a current macroblock of a current frame;
    (b) according to the motion vector, retrieving an error count of a referenced macroblock from a previous frame, and setting the error count of the referenced macroblock as an error count of the current macroblock;
    (c) calculating a weight value;
    (d) calculating a new quantization parameter using a bit rate control algorithm, and multiplying the new quantization parameter by the weight value so as to obtain a weighted new quantization parameter; and
    based on an evaluation of the weighted new quantization parameter, performing one of:
    (e) determining if the weighted new quantization parameter of one of the macroblocks is larger than a threshold value and smaller than a preset statistical value, incrementing the error count of said one of the macroblocks by a first predetermined value if affirmative, and preserving the error count of said one of the macroblocks if otherwise; and
    (f) determining if the weighted new quantization parameter of one of the macroblocks belongs to a smallest quantization parameter cluster, preserving the error count of said one of the macroblocks if affirmative, and incrementing the error count of said one of the macroblocks by a second predetermined value if otherwise.

2. The bit rate transcoding method capable of suppressing drift errors as claimed in claim 1, wherein, in step (c), the weight value is calculated according to previous frame errors.

3. The bit rate transcoding method capable of suppressing drift errors as claimed in claim 1, wherein step (c) includes determining if the error count is larger than a threshold value of error count, repeating steps (a) to (c) if affirmative, and calculating the weight value using an old quantization parameter of the previous frame if otherwise.

4. The bit rate transcoding method capable of suppressing drift errors as claimed in claim 1, wherein the bit rate control algorithm is TM5.

5. The bit rate transcoding method capable of suppressing drift errors as claimed in claim 1, wherein, in step (f), when the weighted new quantization parameter of said one of the macroblocks does not belong to the smallest quantization parameter cluster, step (f) further includes determining whether the weighted new quantization parameter of said one of the macroblocks belongs to a middle quantization parameter cluster or a largest quantization parameter cluster, the second predetermined value including a third predetermined value and a fourth predetermined value, and incrementing the error count of said one of the macroblocks by a corresponding one of the third and fourth predetermined values according to the determination result.

6. A bit rate transcoder capable of suppressing drift errors, said bit rate transcoder transforming an input bit stream into an output bit stream having a different bit rate, the input bit stream including a set of DCT coefficients, bit rate control information, an old quantization parameter, and a set of motion vectors of a current macroblock of a current frame, said transcoder comprising:
    an open loop transcoding module including a VLD unit, an inverse quantizing unit, a quantizing unit, a VLC unit, a bit allocation unit, and a quantization parameter calculating unit, the DCT coefficients being inputted into said quantizing unit after being decoded by said VLD unit and inverse quantized by said inverse quantizing unit in sequence, the bit rate control information and the old quantization parameter being inputted into said quantization parameter calculating unit after being processed by said bit allocation unit, said quantization parameter calculating unit calculating a new quantization parameter using a bit rate control algorithm;
    a previous frame error table used to record error counts of all of the macroblocks of a previous frame, and to receive the motion vectors of the current macroblock;
    a current frame error table used to record the error count of the current macroblock, wherein the error count of the current macroblock is retrieved according to the motion vectors from the error count of a previous macroblock referenced by the current macroblock in the previous frame error table;
    an error handling unit used to calculate a weight value sent to said quantization parameter calculating unit, said quantization parameter calculating unit multiplying the new quantization parameter by the weight value so as to obtain a weighted new quantization parameter, said quantization parameter calculating unit sending the weighted new quantization parameter to said quantizing unit, said quantizing unit applying the weighted new quantization parameter to re-quantize the DCT coefficients for subsequent input to said VLC unit, said VLC unit performing encoding to generate a portion of the output bit stream having a different bit rate; and
    an error determining unit, wherein, based on an evaluation of the weighted new quantization parameter, the error determining unit performs one of:
    (i) determining if the weighted new quantization parameter of one of the macroblocks is larger than a threshold value and smaller than a preset statistical value, incrementing the error count of said one of the macroblocks by a first predetermined value if affirmative, and preserving the error count of said one of the macroblocks if otherwise; and
    (ii) determining if the weighted new quantization parameter of one of the macroblocks belongs to a smallest quantization parameter cluster, preserving the error count of said one of the macroblocks if affirmative, and incrementing the error count of said one of the macroblocks by a second predetermined value if otherwise.

7. The bit rate transcoder capable of suppressing drift errors as claimed in claim 6, wherein said error handling unit calculates the weight value with reference to said previous frame error table.

8. The bit rate transcoder capable of suppressing drift errors as claimed in claim 6, wherein said error handling unit further determines if the error count of the current macroblock is larger than a threshold value of error count, re-quantization of the current macroblock being unnecessary if affirmative, and calculates the weight value according to the old quantization parameter if otherwise.

9. The bit rate transcoder capable of suppressing drift errors as claimed in claim 6, wherein the bit rate control algorithm is TM5.

10. The bit rate transcoder capable of suppressing drift errors as claimed in claim 6, wherein the second predetermined value includes a third predetermined value and a fourth predetermined value, and when the weighted new quantization parameter of one of the macroblocks does not belong to the smallest quantization parameter cluster, said error determining unit further determines whether the weighted new quantization parameter of said one of the macroblocks belongs to a middle quantization parameter cluster or a largest quantization parameter cluster, and increments the error count of said one of the macroblocks by the third predetermined value or the fourth predetermined value according to the determination result.

11. An integrated circuit for transforming an input bit stream into an output bit stream having a different bit rate, the input bit stream including a set of DCT coefficients, bit rate control information, an old quantization parameter, and a set of motion vectors of a current macroblock of a current frame, said integrated circuit comprising:
  an open loop transcoding module including a VLD unit, an inverse quantizing unit, a quantizing unit, a VLC unit, a bit allocation unit, and a quantization parameter calculating unit, the DCT coefficients being inputted into said quantizing unit after decoded by said VLD unit and inverse quantized by said inverse quantizing unit in sequence, the bit rate control information and the old quantization parameter being inputted into said quantization parameter calculating unit after being processed by said bit allocation unit, said quantization parameter calculating unit calculating a new quantization parameter using a bit rate control algorithm;
  a previous frame error table used to record error counts of all of the macroblocks of a previous frame, and to receive the motion vectors of the current macroblock;
  a current frame error table used to record the error count of the current macroblock, wherein the error count of the current macroblock is retrieved according to the motion vectors from the error count of a previous macroblock referenced by the current macroblock in the previous frame error table;
  an error handling unit used to calculate a weight value to be sent to said quantization parameter calculating unit, said quantization parameter calculating unit multiplying the new quantization parameter by the weight value so as to obtain a weighted new quantization parameter, said quantization parameter calculating unit sending the weighted new quantization parameter to said quantizing unit, said quantizing unit applying the weighted new quantization parameter to re-quantize the DCT coefficients for subsequent input to said VLC unit, said VLC unit performing encoding to generate a portion of the output bit stream having a different bit rate; and
  an error determining unit, wherein, based on an evaluation of the weighted new quantization parameter, the error determining unit performs one of:
  (i) determining if the weighted new quantization parameter of one of the macroblocks is larger than a threshold value and smaller than a preset statistical value, incrementing the error count of said one of the macroblocks by a first predetermined value if affirmative, and preserving the error count of said one of the macroblocks if otherwise; and
  (ii) determining if the weighted new quantization parameter of one of the macroblocks belongs to a smallest quantization parameter cluster, preserving the error count of said one of the macroblocks if affirmative, and incrementing the error count of said one of the macroblocks by a second predetermined value if otherwise.

12. The integrated circuit as claimed in claim 11, wherein said error handling unit calculates the weight value with reference to said previous frame error table.

13. The integrated circuit as claimed in claim 11, wherein said error handling unit further determines if the error count of the current macroblock is larger than a threshold value of error count, re-quantization of the current macroblock being unnecessary if affirmative, and calculates the weight value according to the old quantization parameter if otherwise.

14. The integrated circuit as claimed in claim 11, wherein the bit rate control algorithm is TM5.

15. The integrated circuit as claimed in claim 11, wherein the second predetermined value includes a third predetermined value and a fourth predetermined value, and when the weighted new quantization parameter of one of the macroblocks does not belong to the smallest quantization parameter cluster, said error determining unit further determines whether the weighted new quantization parameter of said one of the macroblocks belongs to a middle quantization parameter cluster or a largest quantization parameter cluster, and increments the error count of said one of the macroblocks by the third predetermined value or the fourth predetermined value according to the determination result.

* * * * *

UNITED STATES PATENT AND TRADEMARK OFFICE
CERTIFICATE OF CORRECTION

PATENT NO. : 8,208,537 B2
APPLICATION NO. : 12/160130
DATED : June 26, 2012
INVENTOR(S) : J. Cheng et al.

It is certified that error appears in the above-identified patent and that said Letters Patent is hereby corrected as shown below:

On the Title page, item (56), page 2, Col. 2, lines 6-7; under Other Publications, "Website article: http://www.impulseadventure.com/photo/ipeg-quantization.html, downloaded on Oct. 31, 2011." should be
-- Website article: http://www.impulseadventure.com/photo/jpeg-quantization.html, downloaded on Oct. 31, 2011. --

Signed and Sealed this
Eighteenth Day of September, 2012

David J. Kappos
*Director of the United States Patent and Trademark Office*